United States Patent [19]

van Wijk

[11] Patent Number: 5,381,232
[45] Date of Patent: Jan. 10, 1995

[54] FABRY-PEROT WITH DEVICE MIRRORS INCLUDING A DIELECTRIC COATING OUTSIDE THE RESONANT CAVITY

[75] Inventor: Robert J. van Wijk, Arnhem, Netherlands

[73] Assignee: Akzo Nobel N.V., Arnhem, Netherlands

[21] Appl. No.: 63,591

[22] Filed: May 18, 1993

[30] Foreign Application Priority Data

May 19, 1992 [EP] European Pat. Off. ............ 92201408

[51] Int. Cl.⁶ ............................................. G01B 9/02
[52] U.S. Cl. .................................................. 356/352
[58] Field of Search ..................... 356/352, 346, 345

[56] References Cited

U.S. PATENT DOCUMENTS

| | | | |
|---|---|---|---|
| 4,400,058 | 8/1983 | Durand et al. | 356/352 |
| 4,790,634 | 12/1988 | Miller et al. | 356/352 |

FOREIGN PATENT DOCUMENTS

| | | |
|---|---|---|
| 350112 | 1/1990 | European Pat. Off. |
| 350113 | 1/1990 | European Pat. Off. |
| 358476 | 3/1990 | European Pat. Off. |
| 359648 | 3/1990 | European Pat. Off. |
| 371695 | 6/1990 | European Pat. Off. |
| 378185 | 7/1990 | European Pat. Off. |
| 445864 | 9/1991 | European Pat. Off. |
| 2082380 | 3/1982 | United Kingdom . |

OTHER PUBLICATIONS

M. Born et al., "Principles of Optics", Pergamon Press, 4th ed. (1970), pp. 322-333.
Optik, vol. 50, No. 4 (1978) pp. 329-340.
Thin Solid Films, 137 (1986) Mar. 15, 1986, No. 2, pp. 161-168.
Annales de Physique, vol. 6 (1951) pp. 5-107.

*Primary Examiner*—Samuel A. Turner
*Attorney, Agent, or Firm*—Richard P. Fennelly; Louis A. Morris

[57] ABSTRACT

In a Fabry-Perot etalon or interferometer the metal mirrors are each provided with a dielectric coating on the side facing away from the enclosed gap. The dielectric coating leads to the advantage of peak transmittance being improved without the finesse being adversely affected. The dielectric coating is transparent for the wavelength ($\lambda$) used and, preferably, has a thickness of about $0.25\lambda/n$, n being the refractive index of the dielectric coating material. The coating, preferably, is of a material having a high index of refraction, examples thereof including zirconium dioxide, titanium dioxide, zinc sulfide, or zinc selenide.

18 Claims, 5 Drawing Sheets

FABRY-PEROT WITH DEVICE MIRRORS INCLUDING A DIELECTRIC COATING OUTSIDE THE RESONANT CAVITY

The invention pertains to Fabry-Perot etalons and interferometers, hereinafter referred to as "Fabry-Perots" for short.

BACKGROUND OF THE INVENTION

Fabry-Perots are well-known and important optical devices. They may be used as a true interferometer, (e.g., for spectroscopy), as a laser cavity or, more particularly, as an insert in the laser cavity of a single mode laser. Currently, Fabry-Perots are also being suggested as reflection or transmission modulators for optical interconnects.

A Fabry-Perot commonly comprises two reflective surfaces the "mirrors") separated by a determined optical path length (the "gap"). In a Fabry-Perot interferometer the gap enclosed by the mirrors usually comprises air and can be mechanically varied, e.g. by moving one of the mirrors. In a Fabry-Perot etalon the mirrors are usually held fixed, for example by means of a spacer, for which, for example, quartz, or glass is commonly used. Common gap widths for an interferometer vary from several millimeters to several centimeters. Considerably greater gap widths are customary when a Fabry-Perot is employed as a laser resonant cavity. For some applications, including modulators, gap widths may be of the order of one to several micrometers.

In general, two types of mirrors are used in Fabry-Perots, namely, so-called quarter-wave stacks (QWS) of a material that would not exhibit substantial reflectance as a single layer, or mirrors comprising a single layer of a material that is in itself reflecting, usually comprising metal or metal compounds. The mirrors frequently are plane parallel, but curved-mirror systems are also known, notably as laser cavities and as spectrum analyzers.

The invention pertains to Fabry-Perots of the type comprising two mirrors of a reflecting material, such as metal. As is apparent from the above, the inner surfaces of the mirrors are separated from each other to form the gap, the gap width optionally being fixed.

British Patent No. 2,082,380 discloses a Fabry-Perot etalon of this type used in a semiconductor injection laser. The Fabry-Perot is provided with a quarter-wavelength anti-reflection layer on the inner surface of one of the mirrors in order to broaden the spectral emission, to increase the range of single mode operation, and to reduce spread on the far-field pattern. The inner surface of the other mirror is optionally coated with a half-wavelength layer.

In *Annales de Physique* 6 (1951), pages 5 and following, Fabry-Perots are disclosed, the metal mirrors of which are provided with a dielectric layer on the side facing the gap. In the disclosure it is concluded that a single dielectric layer is unsuitable to significantly improve the reflectance of a Fabry-Perot.

European Patent Publication No. 371,695 pertains to a spatial light modulator on the basis of a QWS Fabry-Perot in which the gap comprises a liquid crystal layer and which Fabry-Perot includes metal electrodes. The mirrors in this device are dielectric multilayer films, namely, quarter wave stacks.

QWS Fabry-Perots have also been disclosed in such representative references as *Thin solid Films* vol. 137, No. 2, pages 161-168 (1968) and *Optik*, Vol. 50, No. 4, pages 329-340 (1978).

The state of the art further includes the common knowledge which exists in regard to Fabry-Perots. The original interferometer of this type developed by C. Fabry and A. Perot, for instance, comprises two transparent (glass or quartz) plates with planar surfaces. The inner surfaces are coated with partially transparent films of high reflectivity and are parallel, enclosing an air gap. The transparent plates serve as a substrate for the reflecting coating. These and other known Fabry-Perot mirrors commonly comprise a metal, such as gold, silver or aluminum, or a metal compound, as a reflecting surface.

Naturally, the mirrors of a Fabry-Perot exhibit substantial reflectance, e.g. higher than 90%, but to a certain extent they also show transmittance. Further, mirrors comprised of a material that is in itself reflecting, notably metal mirrors, display absorption of incident light.

The mirror reflectivity being high, the reflectance and transmittance show a series of peaks as a function of the wavelength of the incident light. If the mirror separation is much larger than the wavelength (which is usually the case) the peaks are approximately periodical in the wavelength. The ratio of the distance separating subsequent peaks (the free spectral range, or FSR) to the full-width at half maximum of the peaks is frequently used to specify the quality of a Fabry-Perot. Said ratio is a dimensionless quantity called the "finesse". For many applications a high finesse is desirable.

In order to achieve a high finesse, a high reflectance is generally required. In the case of Fabry-Perots of the type having mirrors comprising metal or metal compounds, increased reflectance usually is attended with increased absorbance. Consequently, in Fabry-Perots of the present type the demand of high finesse competes with that of high peak transmittance. It is therefore desired to improve Fabry-Perots with respect to peak transmittance, without the finesse being adversely affected.

SUMMARY OF THE INVENTION

It is an object of the present invention to provide a Fabry-Perot of the aforementioned type containing mirrors of material that is in itself reflecting, such as metal or metal compounds, which exhibits improved transmittance while retaining a high finesse. It is a further object of the invention to provide a Fabry-Perot of the type in which the mirrors are of a material that in itself is reflecting, such as metal, which allows improved finesse while retaining good transmittance. Still another object of the invention is to provide a metal mirrors-containing Fabry-Perot that simultaneously displays improved transmittance and a higher finesse.

The invention consists in that in a Fabry-Perot of the type described above the mirrors are each provided with a dielectric coating on the side facing away from the gap.

DETAILED DESCRIPTION OF THE INVENTION

Figure 1:
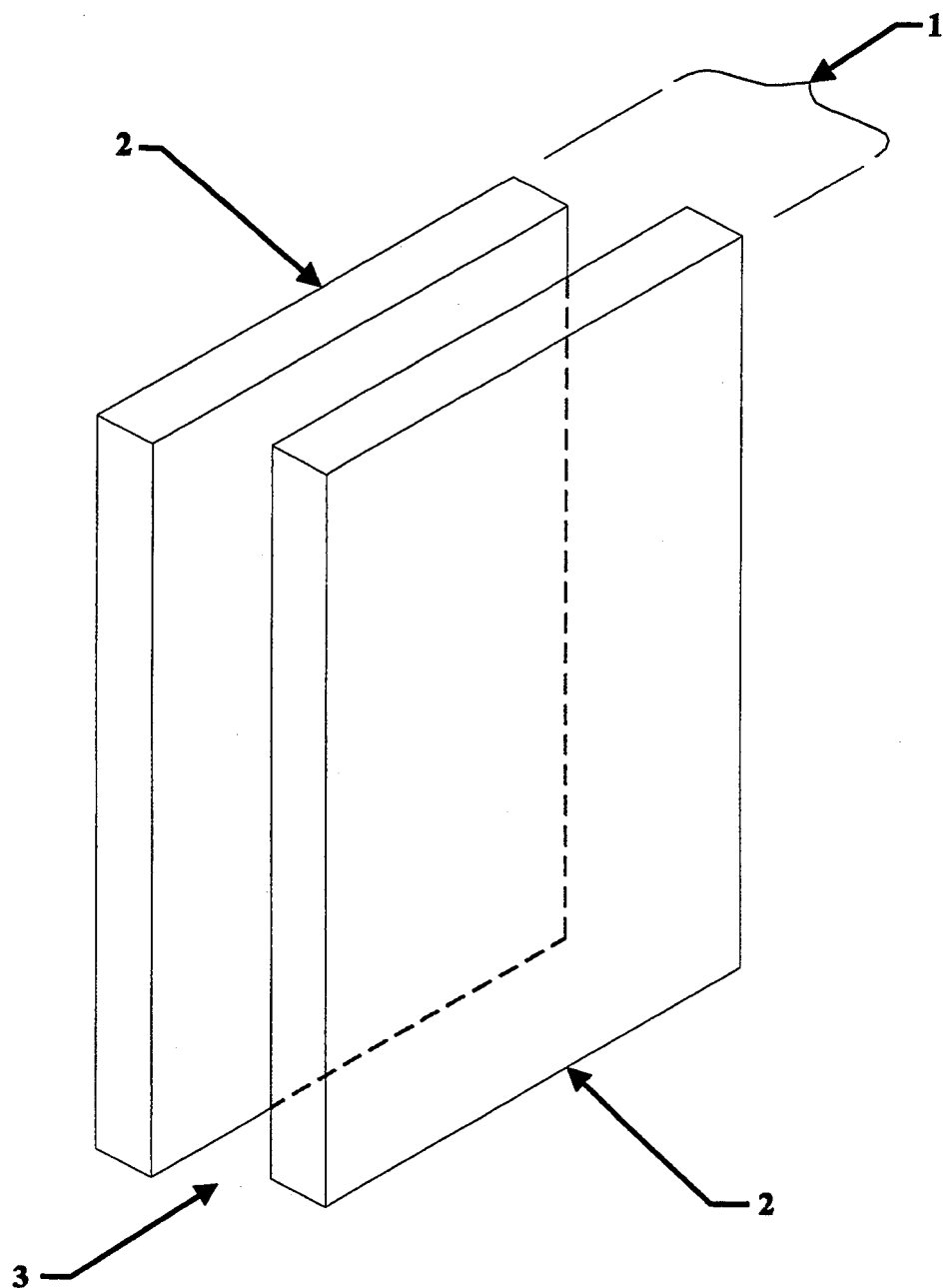
FIG. 1 illustrates a conventional Fabry-Perot interferometer.

Turning now to the drawings, as stated above, FIG. 1 illustrates a conventional Fabry-Perot interferometer (1) having mirrors (2) which are separated by a gap (3). As stated on the first page of the present application, two types of mirrors are generally used in Fabry-Perot devices, namely:

(a) "QWS" mirrors, i.e., quarter-wavelength stacks of materials which do not themselves exhibit substantial reflectance as a single layer;

(b) metal mirrors, comprising a single layer of a material which is itself reflective, usually comprising metals or metal compounds.

Figure 2:
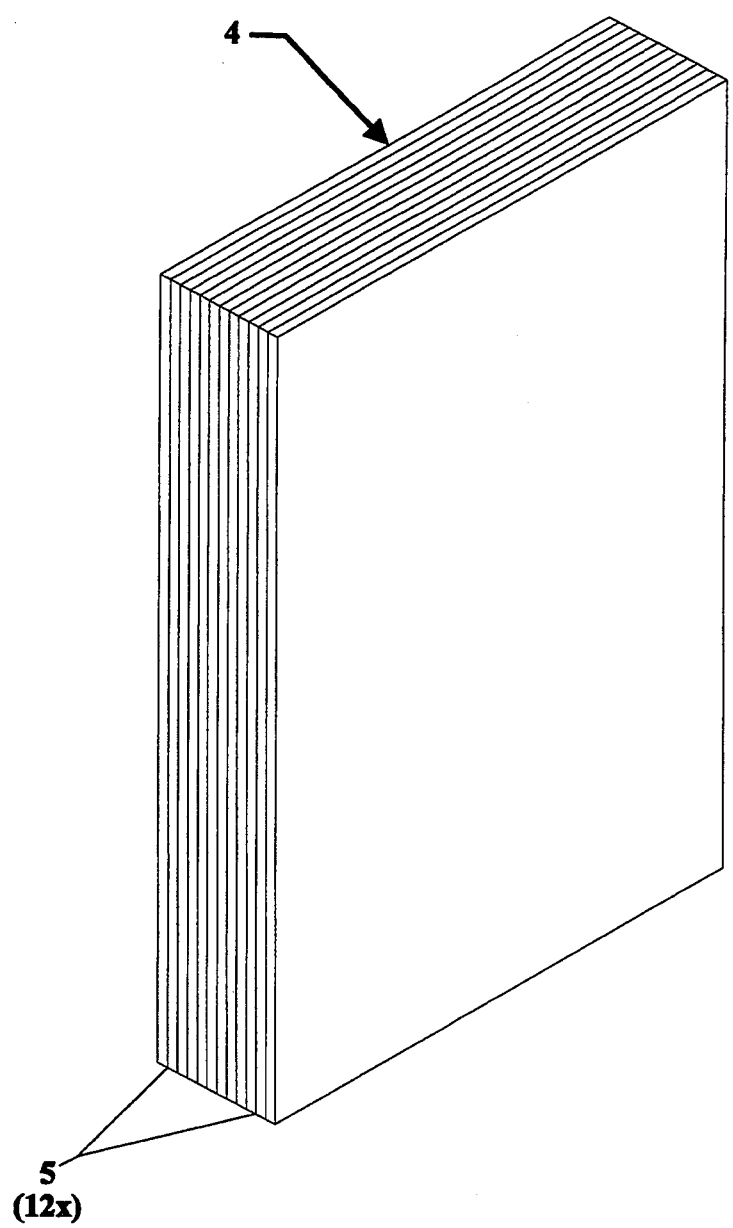
FIG. 2 illustrates a conventional quarter-wave stack mirror.
Figure 3:
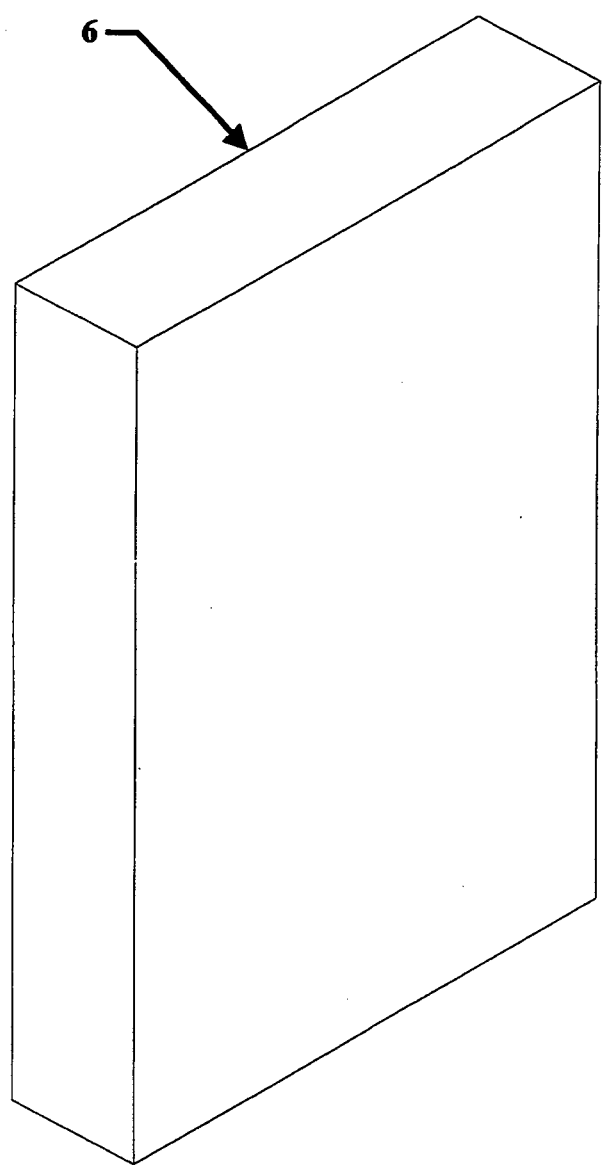
FIG. 3 illustrates a conventional metal mirror.

These types of mirrors (a) and (b) are illustrated in FIGS. 2 and 3. FIG. 2 shows a mirror (5) which consists of a plurality (in this case, 12) of layers (5) having a thickness of $\frac{1}{4}\lambda$ being the wavelength for which the Fabry-Perot device in which the mirror is to be used has been designed to operate). FIG. 3 shows a conventional metal mirror (6) which simply consists of a single layer of a reflective metal material.

Figure 4:
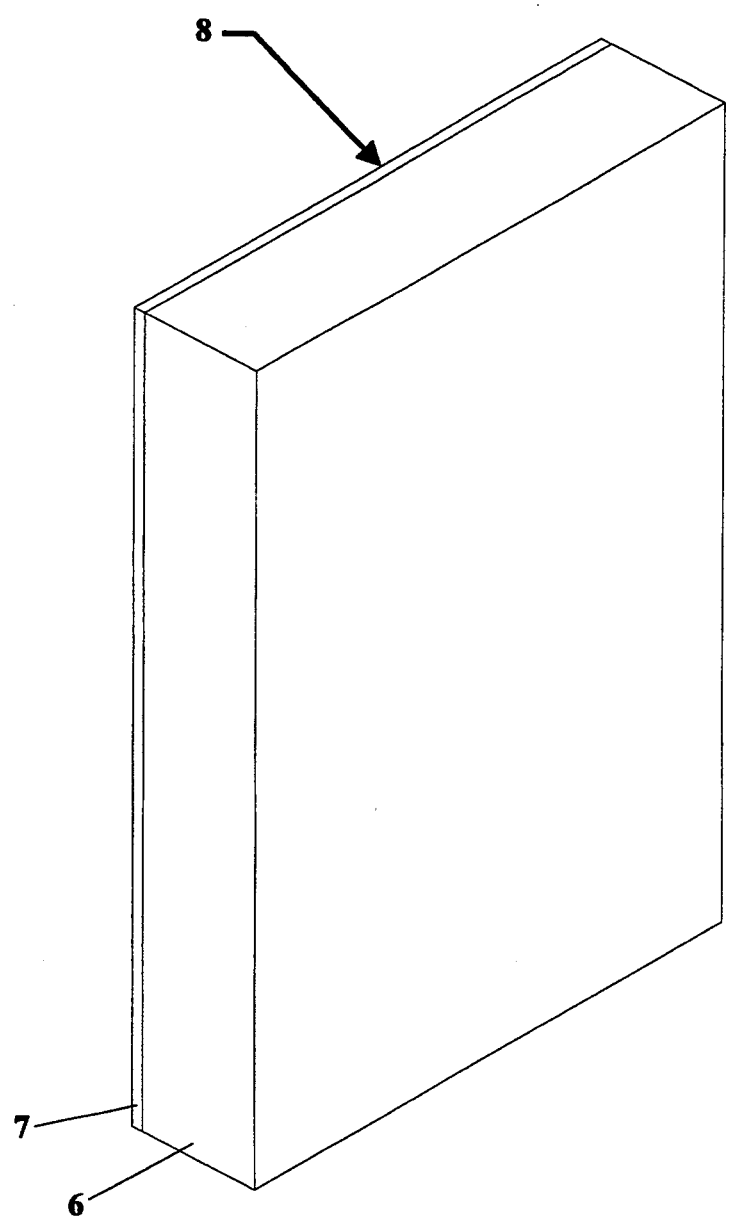
FIG. 4 illustrates a metal mirror modified in accordance with the invention.
Figure 5:
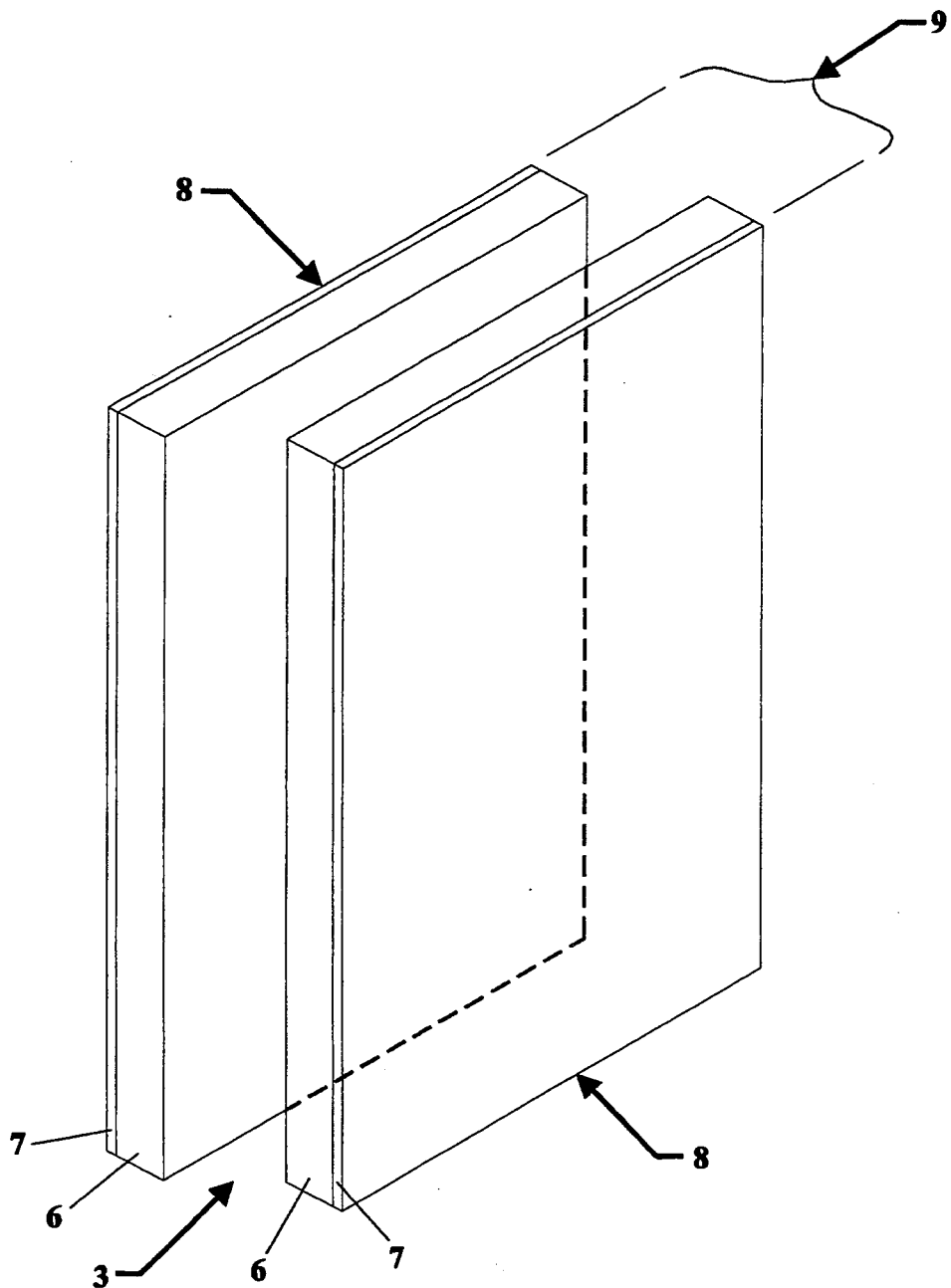
FIG. 5 illustrates a Fabry-Perot device according to the invention

The present invention is directed to Fabry-Perot devices including metal mirrors as described above and in FIG. 3, the invention residing in the dielectric coating applied to each mirror. FIG. 4 illustrates such a mirror (8), which includes a metal mirror (6) having a dielectric coating (7) covering one surface thereof. According to the invention, this dielectric coating is applied to each of the mirrors of a Fabry-Perot device on the side facing away from the gap. FIG. 5 illustrates a Fabry-Perot device according to the invention, comprising two such mirrors (8) enclosing a gap (3). The mirrors (8) each include a metal mirror (6) with dielectric coatings (7) positioned on the side of the device facing away from gap (3).

The dielectric coating may be seen as an analogue of an anti-reflection coating such as is commonly applied to the elements of optical instruments, but has a quite different function. In this respect, it should be clearly recognized that the use of such an anti-reflection coating on the outer surface of the mirrors leads to the desired advantages, whilst the working area of the Fabry-Perot (to which the advantages apply) is within the gap, namely, on the inside of the mirrors.

The dielectric coating should be substantially transparent for the wavelength used. The Fabry-Perots according to the invention hereinafter described are suitable for use with light of any wavelength, $\lambda$. In practice, this light may indeed be of a single wave-length but may also be polychromatic. In the latter case, $\lambda$ indicates the average wavelength.

The dielectric coating will generally function well if it has a thickness of from about $0.1\lambda/n$ to about $0.5\lambda/n$, with n indicating the index of refraction of the dielectric material. Preferably, the dielectric coating has a thickness of about $0.25\lambda/n$. These thicknesses are to be understood as comprising said range plus one or more half wavelengths, as the effect attained is periodical, the period being $0.5\lambda$.

It should be noted that such Fabry-Perots according to the invention are clearly distinguished from Fabry-Perots having quarter-wave stacks as mirrors. As indicated above, the present invention pertains to Fabry-Perots having mirrors comprising a reflecting material, namely, a material that is in itself reflecting, such as a metal or a metal compound. The aforementioned problem that high peak-transmittance and high finesse are competing demands is due to the absorbance observed with mirrors comprising such a reflecting material, and at any rate plays a less significant role in Fabry-Perots having quarter-wave stacks as mirrors. Such Fabry-Perots are outside the scope of the present invention and, besides, are more difficult to produce, as the manufacturing process involves the deposition of a number of quarter-wave layers of two different refractive indices.

In the embodiment in which a Fabry-Perot according to the original construction of C. Fabry and A. Perot is used, namely, one having mirrors comprising a transparent substrate plate coated on the inside, namely, the side facing the gap, with reflecting material, the dielectric coating of the invention is applied between the reflecting material and the substrate.

Suitable dielectric coatings include any inorganic, organic or polymeric materials which satisfy the main requirement of being, for the wavelength used, a non-absorbing layer with an index of refraction higher than the gap medium (air or glass, usually). Examples of inorganic materials are the well-known materials commonly employed in anti-reflection coatings, such as cryolite (a sodium aluminum fluoride compound), magnesium fluoride, cerium fluoride, or a mixture thereof. Examples of polymeric materials are, e.g., those used for optical lenses, such as diethylene glycol bis(allyl carbonate).

It has been found that the higher the refractive index of the dielectric coating, the better the Fabry-Perot according to the instant invention functions. Hence, preferred dielectric coatings are those having a refractive index higher than 2.0. These materials are in fact known from the field of Fabry-Perots. They commonly constitute the high refractive index layers in the aforementioned quarter wave stacks. Preferred dielectric coatings, in this respect, comprise zirconium dioxide, titanium dioxide, zinc sulfide, zinc selenide, or a mixture thereof.

It should be noted that, generally, it will be convenient to apply the same dielectric coating to the surfaces of both mirrors. However, each mirror may also be coated with a different dielectric coating.

The mere coating of the mirrors with dielectric layers, under the conditions set forth above, suffices to enhance the peak-transmittance. For various applications a further enhancement is not necessary, or sometimes even undesirable. However, if an optimum enhancement in peak-transmittance with retained finesse is desired, it is required that the thickness of the mirrors be adapted to the presence of the dielectric coating in such manner that the reflectance inside the gap remains unchanged. It cannot be predicted in general terms whether, in a specific case, the desired adaption can be achieved by increasing or by decreasing the thickness. However, the person of ordinary skill in the art may calculate this, using the theory of Abelès described in M. Born and E. Wolf, "Principles of Optics", Pergamon Press, Oxford, 4th edition, 1970, pages 51 and following and 611 and following.

The further constituents of the Fabry-Perots according to the instant invention are customary. The gap may enclose air, glass, quartz, or any other suitable material, such as a transparent organic polymer. If the Fabry- Perot is to be used as a transmission modulator for optical interconnects, the gap may comprise a non-linear optical (NLO) material, preferably an NLO polymer. NLO materials are well-known in the art and need no further elucidation here. Examples of suitable NLO polymers are those described in European Patent Publication Nos. 350,112, 350,113, 358,476, 445,864, 378,185 and 359,648.

The mirrors may be of any suitable reflecting material, and are in themselves well-known. Common examples of such materials include metals, more particularly gold, silver, or aluminum.

The invention will be further described hereinafter with reference to the following Examples which should be construed to be explanatory rather than limitative.

COMPARATIVE EXAMPLE 1

The Fabry-Perot for comparison purposes was an etalon for use with a wavelength of about 514.5 nm comprising two plane parallel mirrors of silver enclosing a 1 mm gap which mirrors comprised glass having a refractive index of 1.55. The thickness of the mirrors was 50 nm. No dielectric coating was present.

For a wavelength near 514.5 nm the Fabry-Perot etalon displayed a peak transmittance of 3.7% at a finesse of 20.

EXAMPLE 2

The exemplified Fabry-Perot was an etalon as described in Comparative Example 1, above, with the mirrors being coated on the outer surfaces (namely, the surfaces pointing away from the gap) with a dielectric coating of zinc sulfide. The thickness of the dielectric coating was 55.9 nm, its refractive index was 2.3, namely, the Fabry-Perot etalon, in accordance with the invention, comprised a dielectric coating of $0.25\lambda/n$.

For a wavelength near 514.5 nm the Fabry-Perot etalon displayed a peak transmittance of 9.7%, at a finesse of 21.

EXAMPLE 3

The Fabry-Perot exemplified here is an etalon as in Example 2, with the thickness of the mirrors being adjusted to 47.8 nm, in order to have the same internal reflectance as the uncoated Fabry-Perot etalon of comparison.

For a wavelength near 514.5 nm the Fabry-Perot etalon displayed a peak transmittance of 12.5% at a finesse of 20.

I claim:

1. A Fabry-Perot device comprising two mirrors of an inherently reflecting material with the mirrors being separated from each other by a gap wherein the mirrors are each provided with a single dielectric coating on the side facing away from the gap.

2. A Fabry-Perot device according to claim 1, suitable for use with light of average wavelength $\lambda$, wherein the dielectric coating has a refractive index n, and a thickness of from about $0.1\lambda/n$ to about $0.5\lambda/n$.

3. A Fabry-Perot device according to claim 2 wherein the dielectric coating has a thickness of about $0.25\lambda/n$.

4. A Fabry-Perot device according to claim 1 wherein the thickness of the mirrors is adjusted so as to retain the same level of internal reflectance as an uncoated Fabry-Perot device.

5. A Fabry-Perot device according to claim 1 wherein the dielectric coating comprises an organic polymer.

6. A Fabry-Perot device according to claim 1 wherein the dielectric coating comprises cryolite, magnesium fluoride, cerium fluoride, or a mixture thereof.

7. A Fabry-Perot device according to claim 1 wherein the dielectric coating has a refractive index higher than 2.0.

8. A Fabry-Perot device according to claim 7, wherein the dielectric coating comprises zirconium dioxide, titanium dioxide, zinc sulfide, zinc selenide, or a mixture thereof.

9. A Fabry-Perot device according to claim 1 wherein the gap contains a non-linear optical polymer.

10. A Fabry-Perot device according to claim 2 wherein the dielectric coating comprises an organic polymer.

11. A Fabry-Perot device according to claim 2 wherein the dielectric coating comprises cryolite, magnesium fluoride, cerium fluoride, or a mixture thereof.

12. A Fabry-Perot device according to claim 2 wherein the dielectric coating has a refractive index higher than 2.0.

13. A Fabry-Perot device according to claim 12 wherein the dielectric coating comprises zirconium dioxide, titanium dioxide, zinc sulfide, zinc selenide, or a mixture thereof.

14. The Fabry-Perot device of claim 1 wherein said mirrors are composed entirely of metal.

15. The Fabry-Perot device of claim 14 wherein each of said mirrors is a single layer of metal.

16. The Fabry-Perot device of claim 14 wherein said metal is selected from the group consisting of silver, gold and aluminum.

17. A Fabry-Perot device comprising two mirrors, each consisting essentially of a single layer of an inherently reflective metal, which mirrors are separated from each other by a gap, each mirror being provided with a single dielectric coating on the side facing away from said gap.

18. A Fabry-Perot device comprising two mirrors, each comprising a single layer of a reflective metal on a transparent substrate plate and a single dielectric coating between said metal layer and said substrate, with said mirrors being separated from each other by a gap adjacent to each of said metal layers.

* * * * *